United States Patent
Garbagnati

[19]

[11] Patent Number: 6,155,406
[45] Date of Patent: Dec. 5, 2000

[54] MAGNETIC GUIDE

[75] Inventor: Carlo Garbagnati, Castello Brianza, Italy

[73] Assignee: Regina Sud S.p.A., Borgo San Michele, Italy

[21] Appl. No.: 09/146,195

[22] Filed: Sep. 3, 1998

[30] Foreign Application Priority Data

Sep. 18, 1997 [IT] Italy ................................ MI970668 U

[51] Int. Cl.$^7$ .................................................. B65G 21/20
[52] U.S. Cl. .......................................................... 198/805
[58] Field of Search ............................................. 198/805

[56] References Cited

U.S. PATENT DOCUMENTS

| | | | |
|---|---|---|---|
| 4,643,298 | 2/1987 | Wallaart | 198/805 |
| 4,742,906 | 5/1988 | Wallaart | 198/805 |
| 5,036,969 | 8/1991 | Garbagnati | 198/805 |
| 5,890,583 | 4/1999 | Garbagnati | 198/805 |

FOREIGN PATENT DOCUMENTS

| | | |
|---|---|---|
| 159074 | 10/1985 | European Pat. Off. . |
| 0286173 | 10/1988 | European Pat. Off. . |
| 325333 | 7/1989 | European Pat. Off. . |
| 447696 | 9/1991 | European Pat. Off. . |
| 775649 | 5/1997 | European Pat. Off. . |
| 0790197 | 8/1997 | European Pat. Off. . |
| 9205019 | 8/1993 | Germany . |

Primary Examiner—Jospeh E. Valenza
Attorney, Agent, or Firm—Stevens, Davis, Miller & Mosher, LLP

[57] ABSTRACT

A magnetic guide for a chain conveyor with ferromagnetic parts comprises at the top a U-shaped member (12) in a single piece having a central channel (13) and upper surfaces (25) arranged at the two sides of the channel to define running surfaces for the chain. The U-shaped member is assembled on a base member (11). The base member (11) comprises at least one seat (16) open above and completely receiving the magnets (17) for attraction of the chain against the running surfaces of the U-shaped member. The U-shaped member (12) identifies a lower supporting surface (20) on the base member for closing of the seat (16) of the magnets in the base member.

10 Claims, 4 Drawing Sheets ial parts of the chain. But it must be considered that the U-shaped member is subject to wear and must therefore be replaced periodically by disassembling it from the base member. The U-shaped member with seats and magnets fixed in them is however a relatively costly assembly. On the other hand disassembly of the individual magnets from the worn member and their transfer to the new U-shaped member is a long and costly operation. Even if they are not reused the magnets must be disassembled from the U-shaped member to perform differentiated refuse elimination.

MAGNETIC GUIDE

BACKGROUND OF THE INVENTION

The present invention relates to a magnetic guide of the type comprising an upper U-shaped member forming a running channel for a conveyor chain. In this type of guide the U-shaped member is assembled on a base member forming a fixed structure of the conveyor system.

In the prior art it was proposed to insert magnets in seats in the U-shaped member to hold the chain in position and entirely or partly made of ferromagnetic material. In this manner the problem arose of how to receive and hold the magnets in the U-shaped member.

Depending on their position on the U-shaped member there have been proposed various solutions for the closing of the seats. For example, EP 0,325,333 describes solutions for closing the seats when they face the central channel of the U-shaped member.

EP 0,159,074 describes guides with magnet seats which open on the lower face of the U-shaped member and are closed by purposeful strips of flexible material. To seek to hold the magnets steady in the seats, elastic buffers, for example of rubber, are arranged between the strips and the magnets.

Insertion of the magnets in seats in the U-shaped member permits holding the distance between the magnets and the ferromagnetic parts of the chain smaller. But it must be considered that the U-shaped member is subject to wear and must therefore be replaced periodically by disassembling it from the base member. The U-shaped member with seats and magnets fixed in them is however a relatively costly assembly. On the other hand disassembly of the individual magnets from the worn member and their transfer to the new U-shaped member is a long and costly operation. Even if they are not reused the magnets must be disassembled from the U-shaped member to perform differentiated refuse elimination.

Since insertion of the magnets one by one in the seats is an operation requiring much time and it is made difficult by the force of attraction between the magnets themselves there has also been proposed in EP 0,447,696 to provide a single elongated member in which are enclosed all the magnets of one side of the guide. The magnets can be introduced this way in the U-shaped member by a single operation. This facilitates both initial assembly and transfer of the magnets from a worn U-shaped member to a new one while making the operation of replacement of the worn U-shaped members more economical.

In EP A 0,775,649 is proposed providing a guide with U-shaped member having cavities for the magnets which are open below and magnets fixed on the base member instead of on the U-shaped member. In this manner the U-shaped member becomes a 'cap' which receives the magnets only upon complete assembly of the guide. This permits disassembly of the U-shaped member only, for example for replacing it when it is worn, while leaving the magnets in their position on the base. The U-shaped member not incorporating the magnets costs less and is easier to replace. Nevertheless the cost of machining necessary to provide the seats therein remains high. In addition the material of the U-shaped members high-strength and costly in itself since it must have high wear resistance and low friction and the 'cap' solution necessitates a relatively high quantity of material to produce the U-shaped member. In addition, when the U-shaped member is removed the magnets remain completely exposed with the risk of accidental blows capable of breaking of removing them. The general purpose of the present invention is to obviate the above mentioned shortcomings by making available a magnetic guide for chain conveyors which would have an excellent magnetic attraction characteristic and an economical and replaceable U-shaped member without compromising easy running of the chain and durability of the parts subject to wear.

SUMMARY OF THE INVENTION

In view of this purpose it was sought to provide in accordance with the present invention a magnetic guide for a chain conveyor with ferromagnetic parts comprising at the top a U-shaped member in a single piece having a central channel and upper surfaces arranged at the two sides of the channel to define running surfaces for the chain and a base member below on which is assembled the U-shaped member and magnets for attraction of the chain against the running surfaces of the U-shaped member characterized in that the base member comprises at least one seat open on the upper side and completely receiving the magnets and the U-shaped member defines a lower supporting surface on the base member for closing of the seat in the base member.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings.

DETAILED DESCRIPTION OF THE INVENTION

Figure 1:
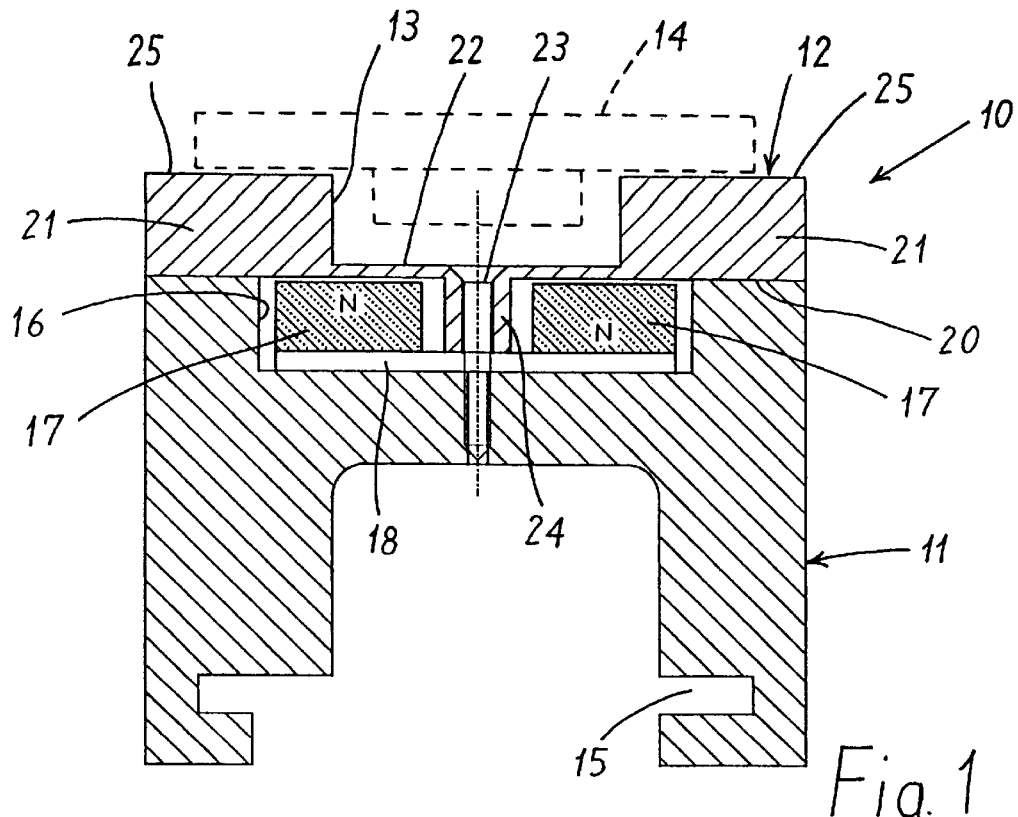
FIG. 1 shows a cross section view of a guide provided in accordance with the present invention along plane of cut II—II of FIG. 3.

With reference to the figures, FIG. 1 shows a segment of a curved guide indicated as a whole by reference number 10 which comprises a base member 11 and an upper member 12. The upper member 12 is made in a single piece and has a central channel 13 and upper side surfaces 25. The channel 13 is for receiving the lower part of a prior art chain 14 made up at least in part of ferromagnetic parts, for example the hinge pins of the links. The chain runs on the surfaces 25 of the upper U-shaped member 12. This member is provided in plastic material selected to give the guide the desired characteristics of wear resistance and low friction. The base member 11 can comprise a return channel 15 on its lower side to receive and support the return leg of the chain in accordance with the prior art.

Figure 2:
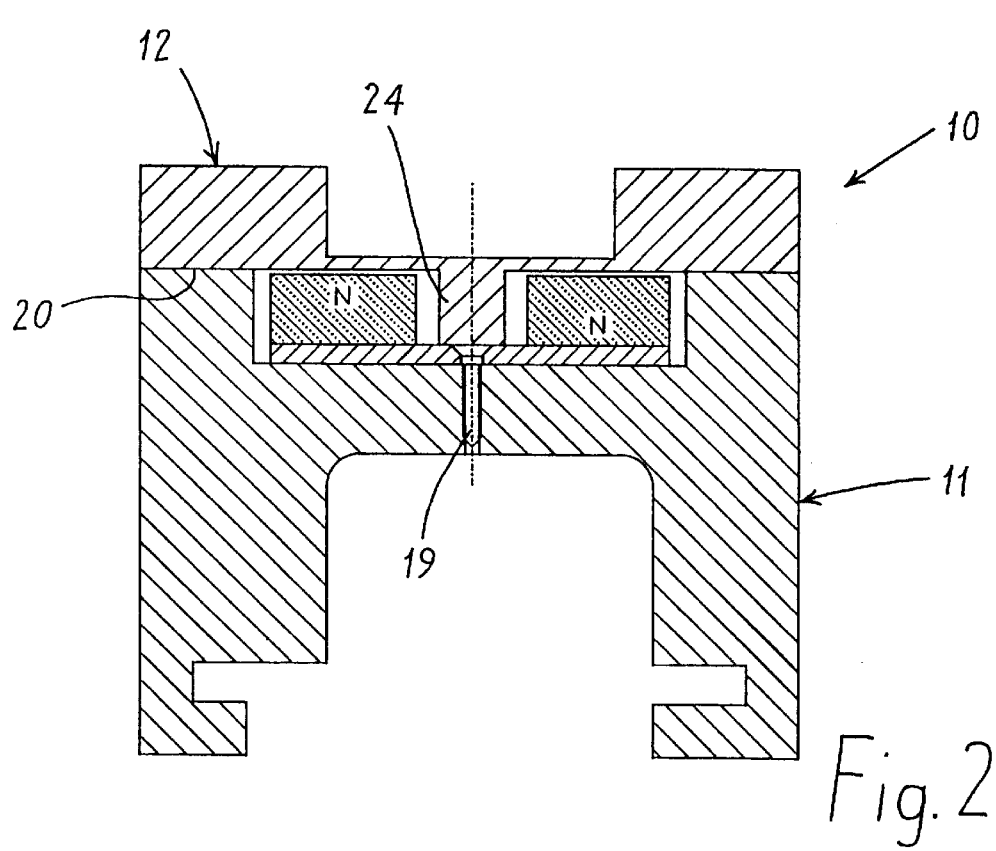
FIG. 2 shows a view similar to that of FIG. 1 but along plane of cut III—III of FIG. 3.
Figure 3:
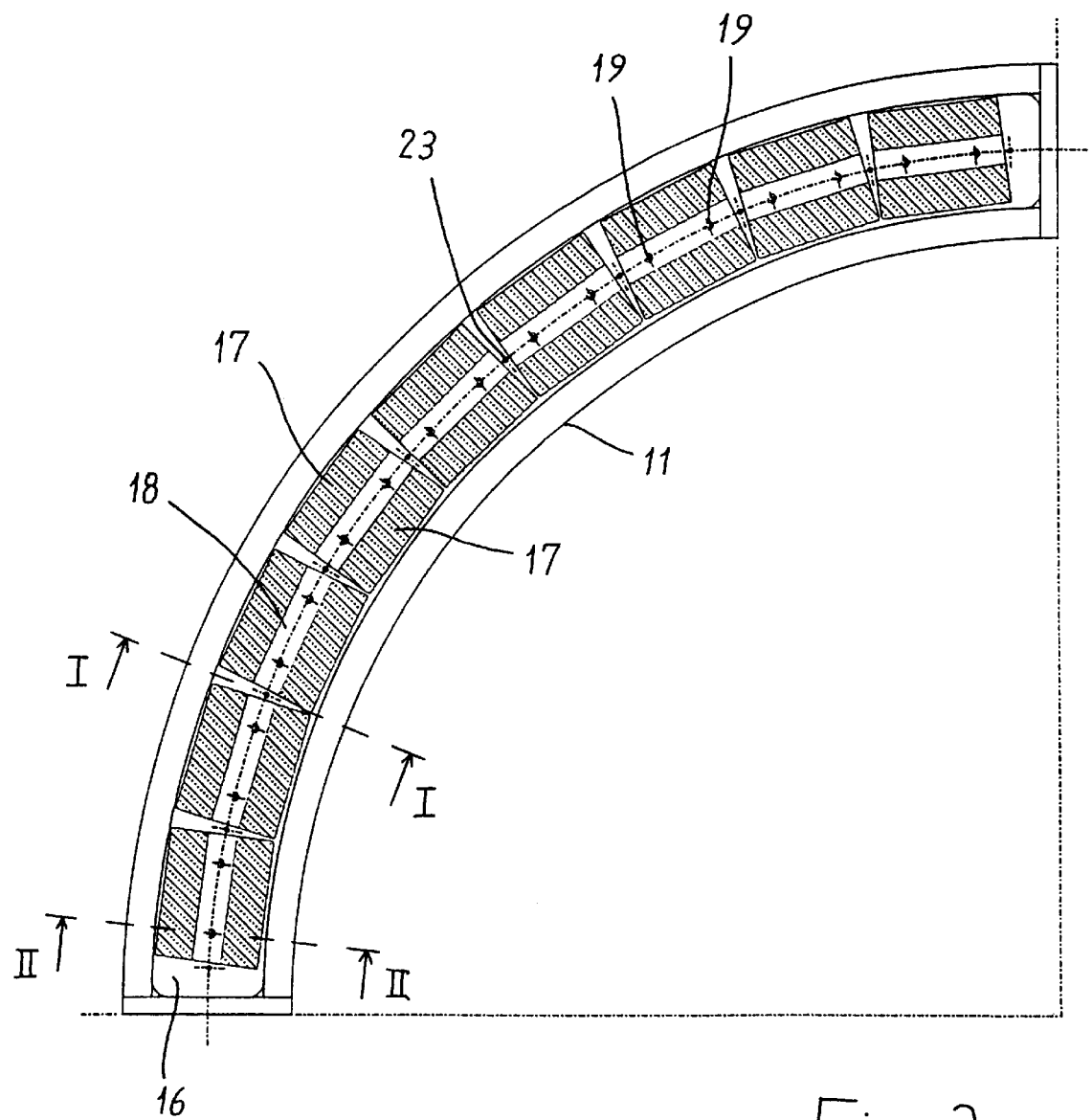
FIG. 3 shows a top plan view of the guide of FIG. 1 without the U-shaped member for running.

In accordance with the present invention as may be seen in FIG. 3 the base member 11 has a channel or seat 16 which opens on the upper face of the base element. In the channel are located a plurality of magnets 17 arranged side by side in pairs on the two sides of the channel 16. Advantageously each pair of magnets is anchored to the bottom of channel 16 by means of a plate 18 of ferromagnetic material screwed to the bottom of the channel 16 by means of screws 19 and to which they are in turn constrained as shown in FIG. 2. The magnets can be fastened to the plates by cementing for example or some other method of fastening.

The U-shaped member 12 for running has a flat lower surface 20 constituting a closing cover for the channel 16 and resting laterally over the flat upper surface of the base member at the sides of the channel 16.

The U-shaped member 12 thus has two side edges with rectangular cross section 21 joined by a flat diaphragm 22.

Figure 4:
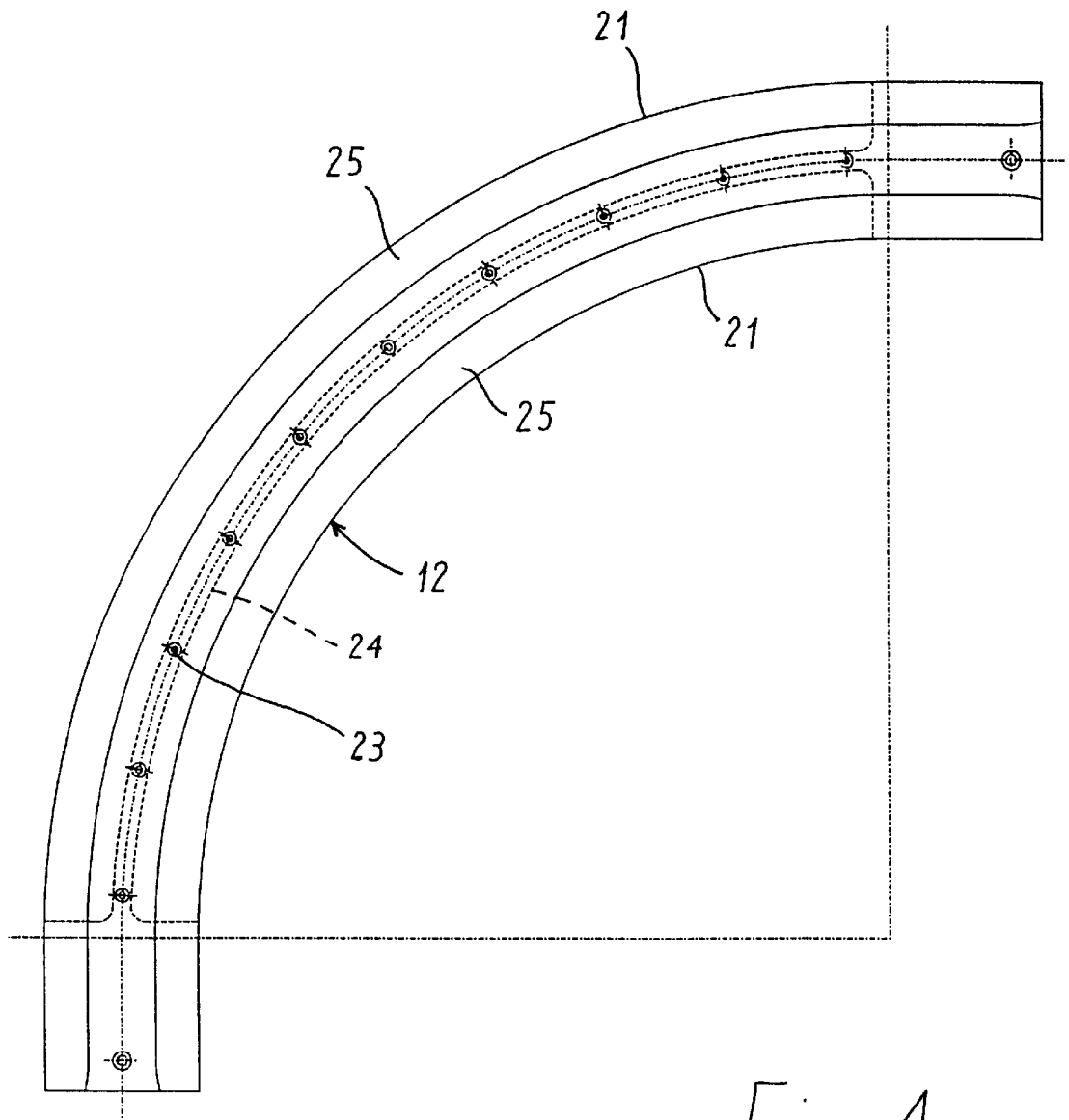
FIG. 4 shows a top plan view of the U-shaped member for running.

The U-shaped member 12 is fastened to the base member by means of screws 23 which traverse the diaphragm 22 along the center line. Advantageously opposite this center line the diaphragm has at the bottom a foot or ribbing 24 which rests on the plate 18 between the magnets of the pairs to avoid an unacceptable bending of the diaphragm upon tightening of the screws 23. The foot 24 can be unbroken for the entire length of the seat 16 as shown in FIG. 4 or broken. Between the magnets and the bottom 20 of the U-shaped member is left play so as to ensure good closing of the channel 16 by the U-shaped member which rests against the upper surface of the base member.

It is now clear that the preset purposes have been achieved. The U-shaped member has a very simple form and is made with a small quantity of material. At the same time the magnets have a position and distance ideal for their action on the ferrromagnetic parts of the chain. In addition, upon disassembly of the U-shaped member the magnets remain protected inside the channel of the base. In this manner it is avoided that accidental blows even due to disassembly or assembly of the U-shaped member might break or remove the magnets.

Naturally the above description of an embodiment applying the innovative principles of the present invention is given by way of non-limiting example of said principles and therefore is not to be taken as a limitation on the scope of protection of the exclusive right claimed here. For example, the number of magnets, the relative sizing of the parts, radius and length of the bend etcetera can vary depending on specific application requirements. In addition the seat for reception of the channels can be broken, for example to form separate seats for each magnet pair.

Figure 5:
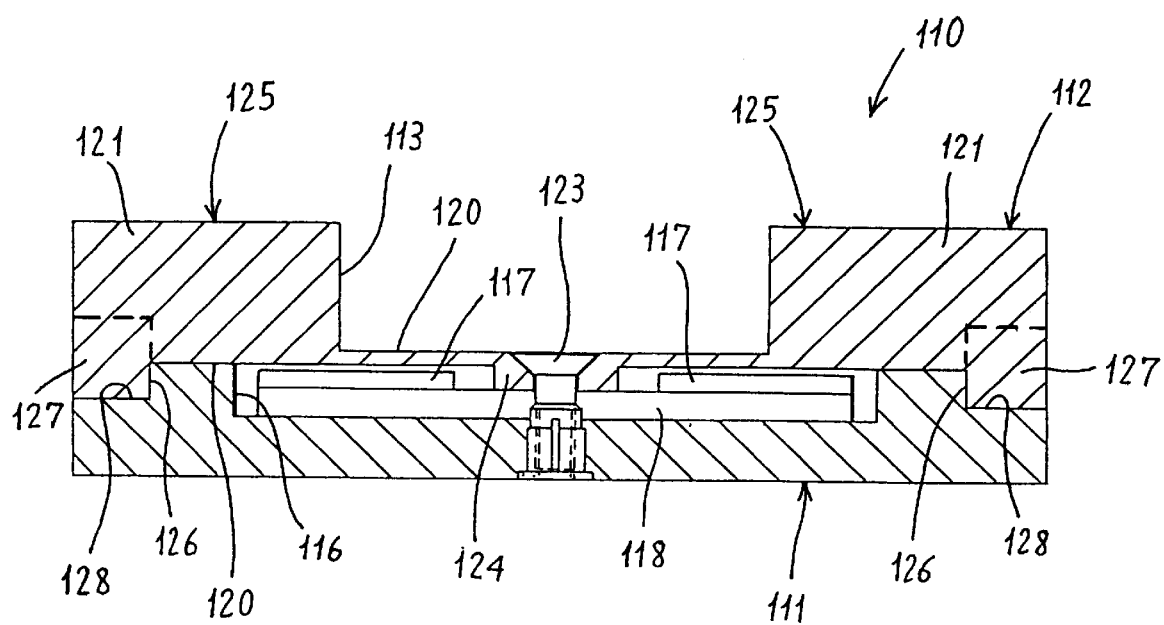
FIG. 5 shows a view similar to that of FIG. 1 of a second embodiment of the invention.

FIG. 5 shows a possible variation of the segment of the curved guide of FIG. 1. Part similar to those of FIG. 1 are indicated by the same number increased by 100.

Consequently, there is a curved guide 110 which comprises a base member 111 and an upper member 112.

The upper member 112 is made in a single piece with edges 121 joined by a diaphragm 122 and has a central channel 113 and upper side surfaces 125 to receive and support a chain as shown in FIG. 1.

The base member 111 has a channel or seat 116 in which are located magnets 117 arranged side by side in pairs on the two sides of the channel 116, as shown in FIG. 3 for the magnets 17.

Advantageously each pair of magnets is anchored to the bottom of channel 116 by means of a plate 118 of ferromagnetic material screwed to the bottom of the channel 116.

The U-shaped member 112 has a lower surface 120 constituting a closing cover for the channel 116. The U-shaped member 112 is fastened to the base member by means of screws 123.

In the possible variation of the embodiment, the supporting surface 120 between base member and U-shaped member comprises steps 126 to form a rib or rim 127 projecting downwardly on each side of the U-shaped member. The rims 127 are received in corresponding seats 128 in the base member. In this manner, the rims 127 and respective seats 128 drive the coupling of the U-shaped member on the base member. In addition, the coupling between rim and seat relieves the screws 123 of the lateral forces between U-shaped member and base member. However, the quantity of material of the U-shaped member is reduced in comparison with material employed in guides of the prior art.

The rib 127 can be in the base member and the complementary seat can be in the upper member, as shown in dashed line in FIG. 5. The rib 127 can be differently sizing in respect of the drawing on specific application requirements.

What is claimed is:

1. Magnetic guide for a chain-conveyor with ferromagnetic parts comprising at the top a U-shaped member in a single piece having a central channel and upper surfaces arranged at the two sides of the channel to define running surfaces for the chain and a base member below on which is assembled the U-shaped member and magnets for attraction of the chain against the running surfaces of the U-shaped member wherein the base member comprises at least one seat open on the upper side and completely receiving the magnets and the U-shaped member defines a lower supporting surface for the base member for closing of the seat in the base member, wherein the U-shaped member comprises two side edges with rectangular section joined below by a flat horizontal diaphragm for identifying at least part of said supporting surface with there being below the diaphragm in an intermediate position a foot for supporting the U-shaped member in the magnet reception seat.

2. Guide in accordance with claim 1, wherein the U-shaped member is fastened to the base member through screws inserted above through the diaphragm to pass the supporting foot and screw into the base member.

3. Magnetic guide for a chain conveyor with ferromagnetic parts comprising at the top a U-shaped member in a single piece having a central channel and upper surfaces arranged at the two sides of the channel to define running surfaces for the chain and a base member below on which is assembled the U-shaped member and magnets for attraction of the chain against the running surfaces of the U-shaped member wherein the base member comprises at least one seat open on the upper side and completely receiving the magnets and the U-shaped member defines a lower supporting surface for the base member for closing of the seat in the base member, wherein in the seat are located magnets arranged side by side transversely in pairs with each magnet pair being anchored to the seat by means of a plate of ferromagnetic material screwed to the bottom of the seat.

4. Guide in accordance with claim 3, wherein the magnets are cemented to their respective plates.

5. Guide in accordance with claim 1, wherein the seat in the base member for completely receiving the magnets extends longitudinally to form an unbroken channel for containing the magnets.

6. Guide in accordance with claim 1, wherein the seat in the base member extends longitudinally to form an unbroken channel for containing the magnets and the supporting foot extends unbroken for virtually the entire length of the channel in the base element.

7. Magnetic guide for a chain conveyor with ferromagnetic parts comprising at the top a U-shaped member in a single piece having a central channel and upper surfaces arranged at the two sides of the channel to define running surfaces for the chain and a base member below on which is assembled the U-shaped member and magnets for attraction of the chain against the running surfaces of the U-shaped member wherein the base member comprises at least one seat open on the upper side and completely receiving the magnets and the U-shaped member defines a lower supporting surface for the base member for closing of the seat in the base member, wherein between the U-shaped member and the base member a rim exists, near each side of the guide, the rim projecting from one of the member for engaging in a complementary seat in the other member.

8. Guide in accordance with claim 7, wherein the supporting surface comprises, near each side of the guide, a step for identifying the rim projecting downwardly from the U-shaped member to be received in a corresponding lateral seat in the base member.

9. Guide in accordance with claim 3, wherein the seat in the base member for completely receiving the magnets extends longitudinally to form an unbroken channel for containing the magnets.

10. Guide in accordance with claim 7, wherein the seat in the base member for completely receiving the magnets extends longitudinally to form an unbroken channel for containing the magnets.

* * * * *